US006810837B2

(12) United States Patent
Lazarus et al.

(10) Patent No.: US 6,810,837 B2
(45) Date of Patent: Nov. 2, 2004

(54) APPARATUS AND METHODS FOR CONTROLLING FLOW IN BWR STEAM DRYERS

(75) Inventors: Johnathan D. Lazarus, Sunnyvale, CA (US); John Lynch, Gilroy, CA (US); Alfred S. Nelson, San Jose, CA (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 09/683,790

(22) Filed: Feb. 14, 2002

(65) Prior Publication Data

US 2003/0150405 A1 Aug. 14, 2003

(51) Int. Cl.[7] ................................................. F28B 1/00
(52) U.S. Cl. ........................ 122/459; 122/32; 122/4 R
(58) Field of Search .................... 122/459, 32, 4 R, 122/34, 491

(56) References Cited

U.S. PATENT DOCUMENTS 3,720,046 A    3/1973   Kudirka et al.
4,736,713 A *  4/1988   Roarty ........................ 122/32
4,912,733 A    3/1990   Gluntz
5,075,074 A   12/1991   Gluntz
5,085,826 A    2/1992   Oosterkamp
5,283,809 A    2/1994   Challberg et al.
5,963,611 A   10/1999   Narabayashi et al.

FOREIGN PATENT DOCUMENTS

JP       4006496     1/1992
JP       6222190     8/1994
JP       8338605    12/1996
JP    2001041410     2/2001

* cited by examiner

Primary Examiner—Jiping Lu
(74) Attorney, Agent, or Firm—Armstrong Teasdale LLP

(57) ABSTRACT

A flow control apparatus for a boiling water nuclear reactor steam dryer is provided. The steam dryer includes at least one discharge plenum. In an exemplary embodiment, the flow control apparatus includes a support member, an elongate perforated plate member coupled to the support member, and at least one positioning member coupled to the support member.

20 Claims, 6 Drawing Sheets

APPARATUS AND METHODS FOR CONTROLLING FLOW IN BWR STEAM DRYERS

BACKGROUND OF INVENTION

This invention relates generally to nuclear reactors and more particularly, to apparatus for enhancing the performance of the steam dryers in a nuclear reactor pressure vessel.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

Heat is generated within the core and water circulated up through the core is at least partially converted to steam. Steam separators separate the steam and the water. Residual water is removed from the steam by steam dryers located above the core. The de-watered steam exits the RPV through a steam outlet near the vessel top head.

The flow of steam through the dryers can be unbalanced or mismatched, with much of the steam flow preferentially passing through the top of the dryer vanes. At increased power levels of the reactor, increased steam flow may cause the steam velocity to exceed the breakthrough velocity in local regions of the dryer vanes. The dryer ceases to remove moisture droplets from the steam in those areas where the breakthrough velocity has been exceeded. Wet steam that breaks through, or exits the dryer, then can cause undesirable effects in the rest of the power plant. In addition to the potential for erosion of the metal components, the excess moisture can transport activated particulates from the reactor to the pipes, turbines and heat exchangers which are downstream of the separator which can increase the dose rate in the turbine hall, and make equipment maintenance more difficult.

SUMMARY OF INVENTION

In one aspect, a flow control apparatus for a boiling water nuclear reactor steam dryer is provided. The steam dryer includes at least one discharge plenum. The flow control apparatus includes a support member, an elongate perforated plate member coupled to the support member, and at least one positioning member coupled to the support member.

In another aspect, a steam dryer for a nuclear reactor is provided. The steam dryer includes a plurality of dryer vanes, at least one discharge plenum, and a flow control apparatus. The flow control apparatus includes a support member, an elongate perforated plate member coupled to the support member, and at least one positioning member coupled to the support member.

In another aspect, a steam dryer for a nuclear reactor is provided. The steam dryer includes a plurality of dryer vanes, at least one discharge plenum, and a flow control apparatus. The flow control apparatus includes a support member, an elongate perforated plate member coupled to the support member, at least one positioning member coupled to the support member, at least one lip extending longitudinally along a first side of the perforated plate member and substantially perpendicular to the perforated plate member, a first adjustable sealing member coupled to a first end portion of the perforated plate member, and a second adjustable sealing member coupled to a second end portion of the perforated plate member.

DETAILED DESCRIPTION

Flow control apparatus for a boiling water nuclear reactor steam dryer are described below in more detail. The flow control apparatus insert in the discharge plena of the steam dryer and improve the moisture separating efficiency of the steam dryer by balancing the steam flow through the moisture separating elements of the dryer. The flow control apparatus are described below inserted in an exemplary embodiment of a boiling water nuclear reactor. However, the flow control apparatus described below can be used in any design of boiling water nuclear reactor that includes a steam dryer.

Figure 1:
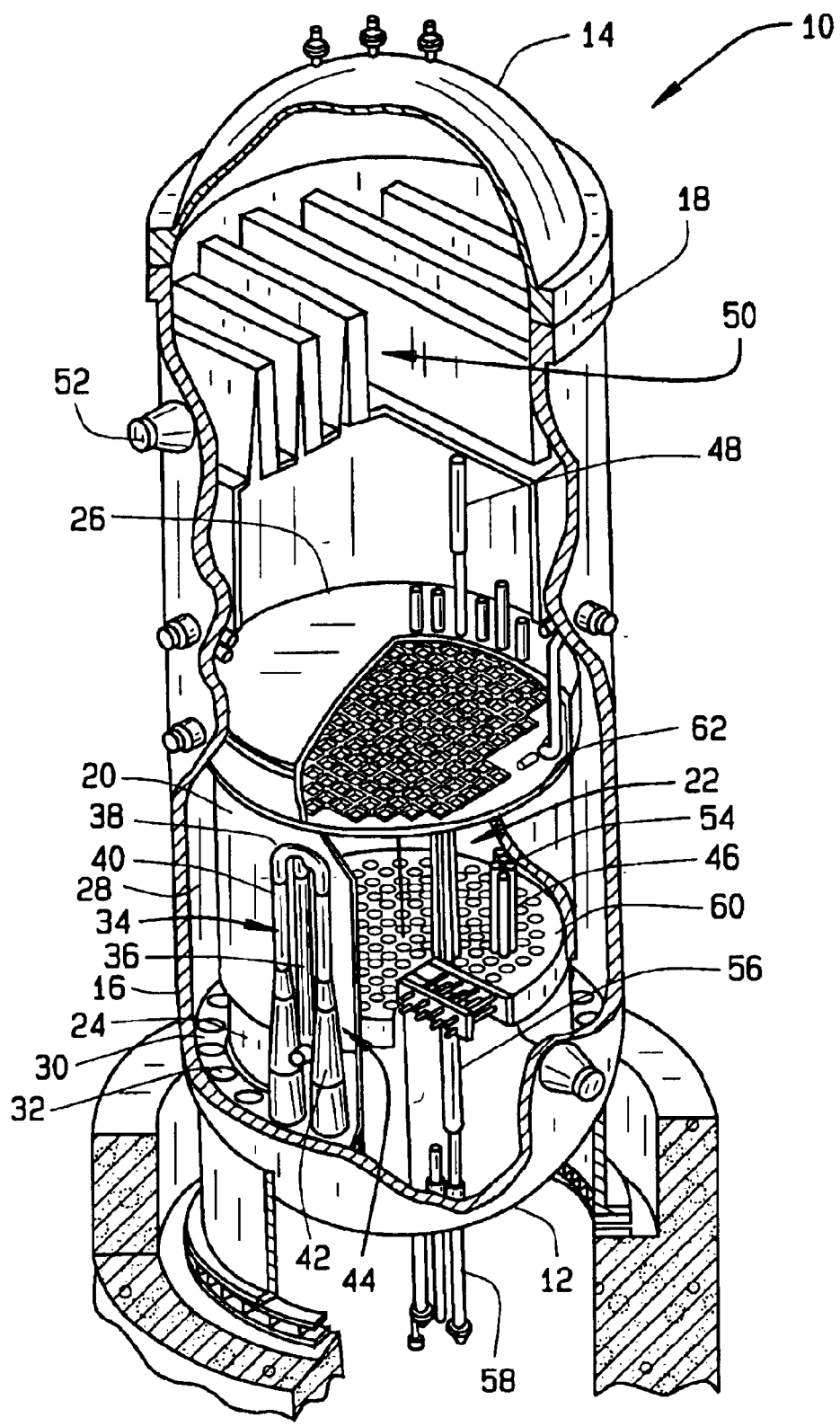
FIG. 1 is a sectional view, with parts cut away, of a boiling water nuclear reactor pressure vessel.

FIG. 1 is a sectional view, with parts cut away, of an exemplary embodiment of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22. Shroud 20 is supported at one end by a shroud support 24 and includes a removable shroud head 26 at the other end. An annulus 28 is formed between shroud 20 and side wall 16. A pump deck 30, which has a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, and a diffuser 42. Inlet riser 36 and two connected jet pumps 34 form a jet pump assembly 44.

Heat is generated within core 22, which includes fuel bundles 46 of fissionable material. Water circulated up through core 22 is at least partially converted to steam. Steam separators 48 separate steam from water, which is recirculated. Residual water is removed from the steam by steam dryers 50. The steam exits RPV 10 through a steam outlet 52 near vessel top head 14.

The amount of heat generated in core 22 is regulated by inserting and withdrawing control rods 54 of neutron absorbing material, such as for example, hafnium. To the extent that control rod 54 is inserted into fuel bundle 46, it absorbs neutrons that would otherwise be available to promote the chain reaction which generates heat in core 22. Control rod guide tubes 56 maintain the vertical motion of control rods 54 during insertion and withdrawal. Control rod drives 58 effect the insertion and withdrawal of control rods 54. Control rod drives 58 extend through bottom head 12. Fuel bundles 46 are aligned by a core plate 60 located at the base of core 22. A top guide 62 aligns fuel bundles 46 as they are lowered into core 22. Core plate 60 and top guide 62 are supported by core shroud 20.

Figure 2:
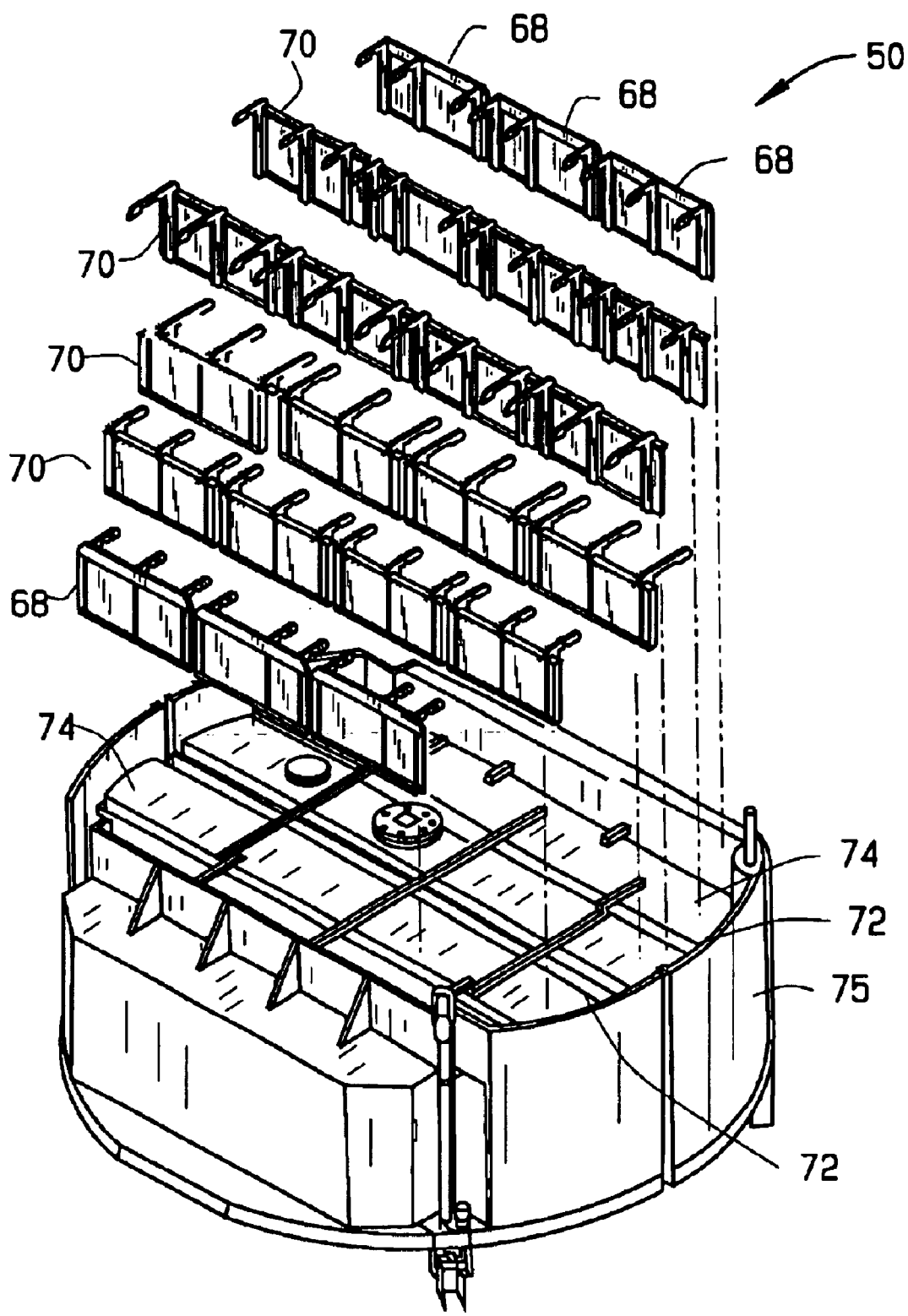
FIG. 2 is an exploded view of the steam dryer shown in FIG. 1 in accordance with an embodiment of the present invention.

FIG. 2 is an exploded view of steam dryer 50. In an exemplary embodiment, steam dryer 50 includes a plurality of first flow control apparatus 68 and a plurality of second flow control apparatus 70 in accordance with an embodiment of the present invention. Dryer 50 includes a plurality of discharge plena 72. Dryer hoods 74 cover the dryer vanes and form discharge plena 72. Flow control apparatus 70 are positioned in discharge plena 72. Dryer 50 also includes a skirt extension 75.

Figure 3:
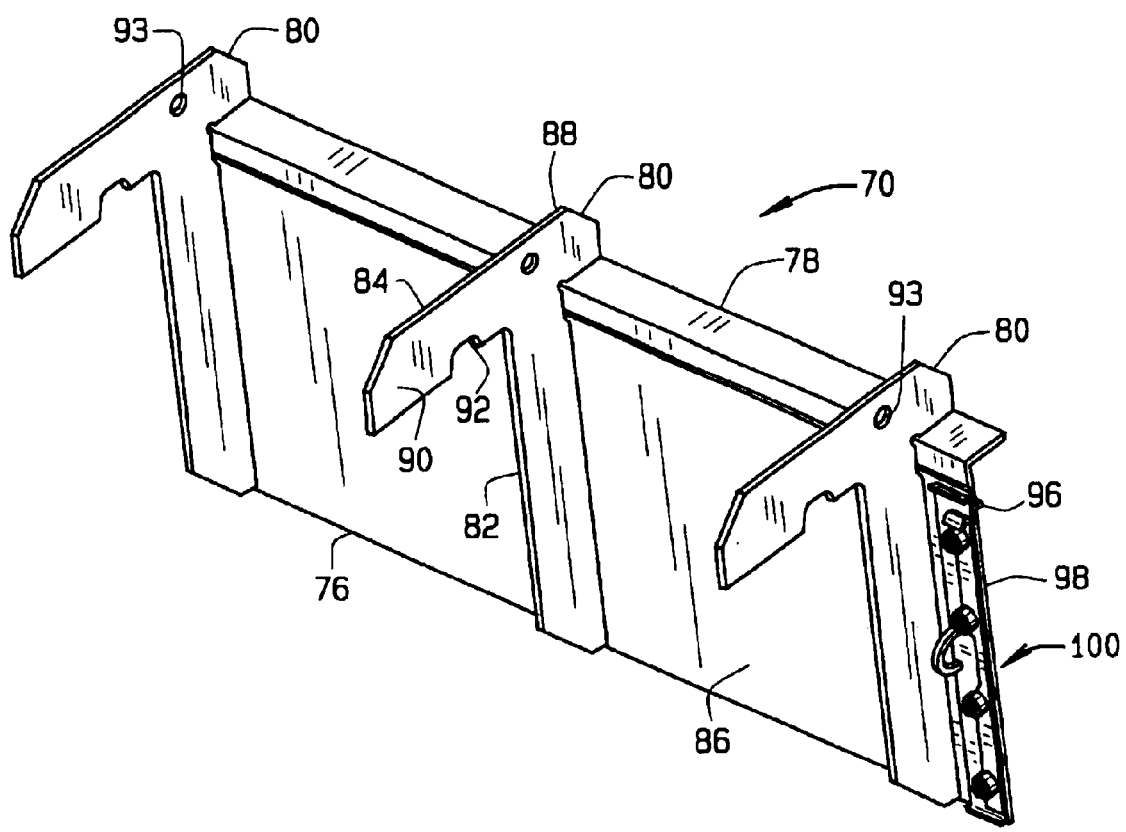
FIG. 3 is a perspective view of one flow control apparatus shown in FIG. 2.
Figure 4:
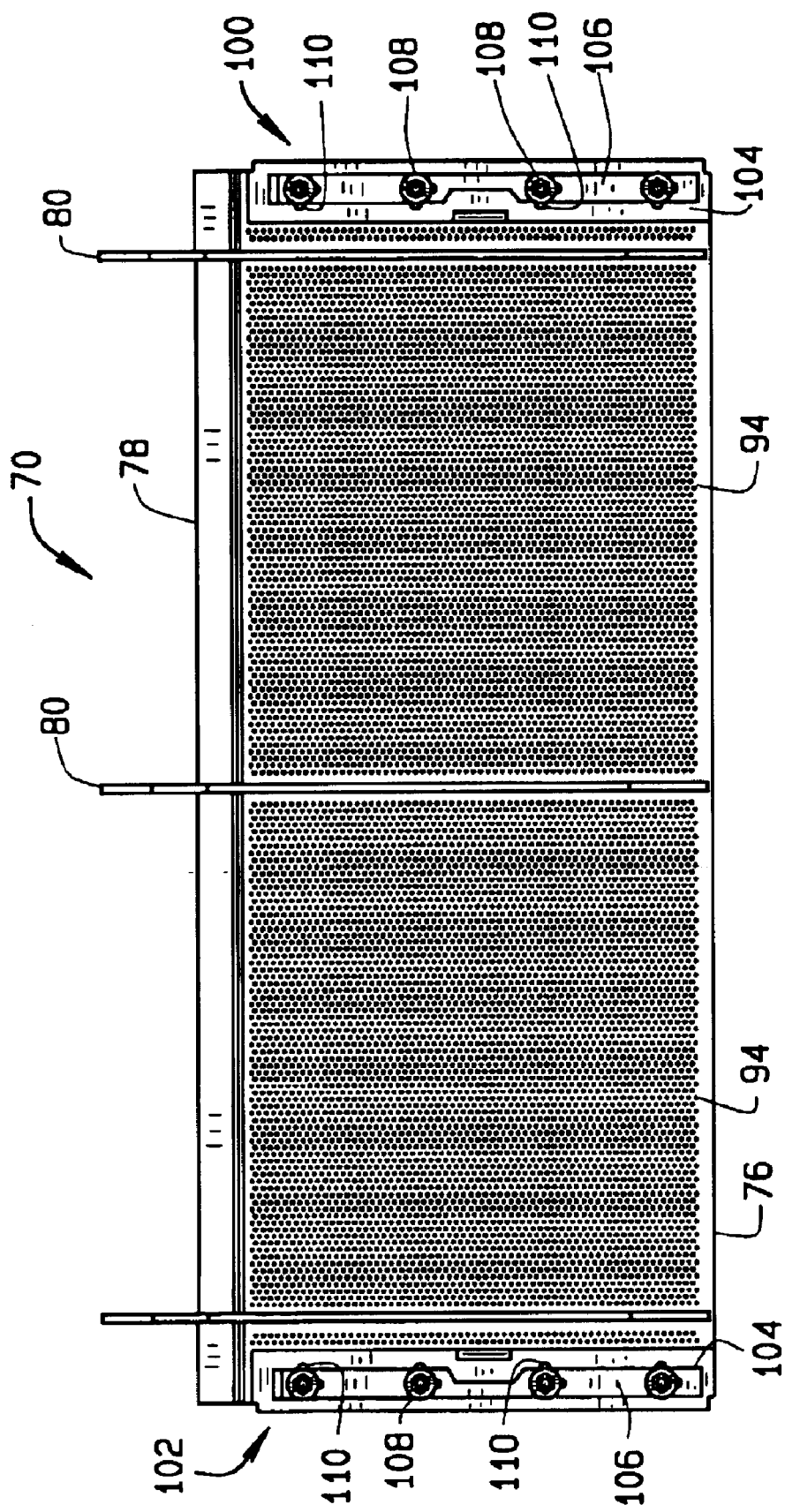
FIG. 4 is a front view of the flow control apparatus shown in FIG. 3.
Figure 5:
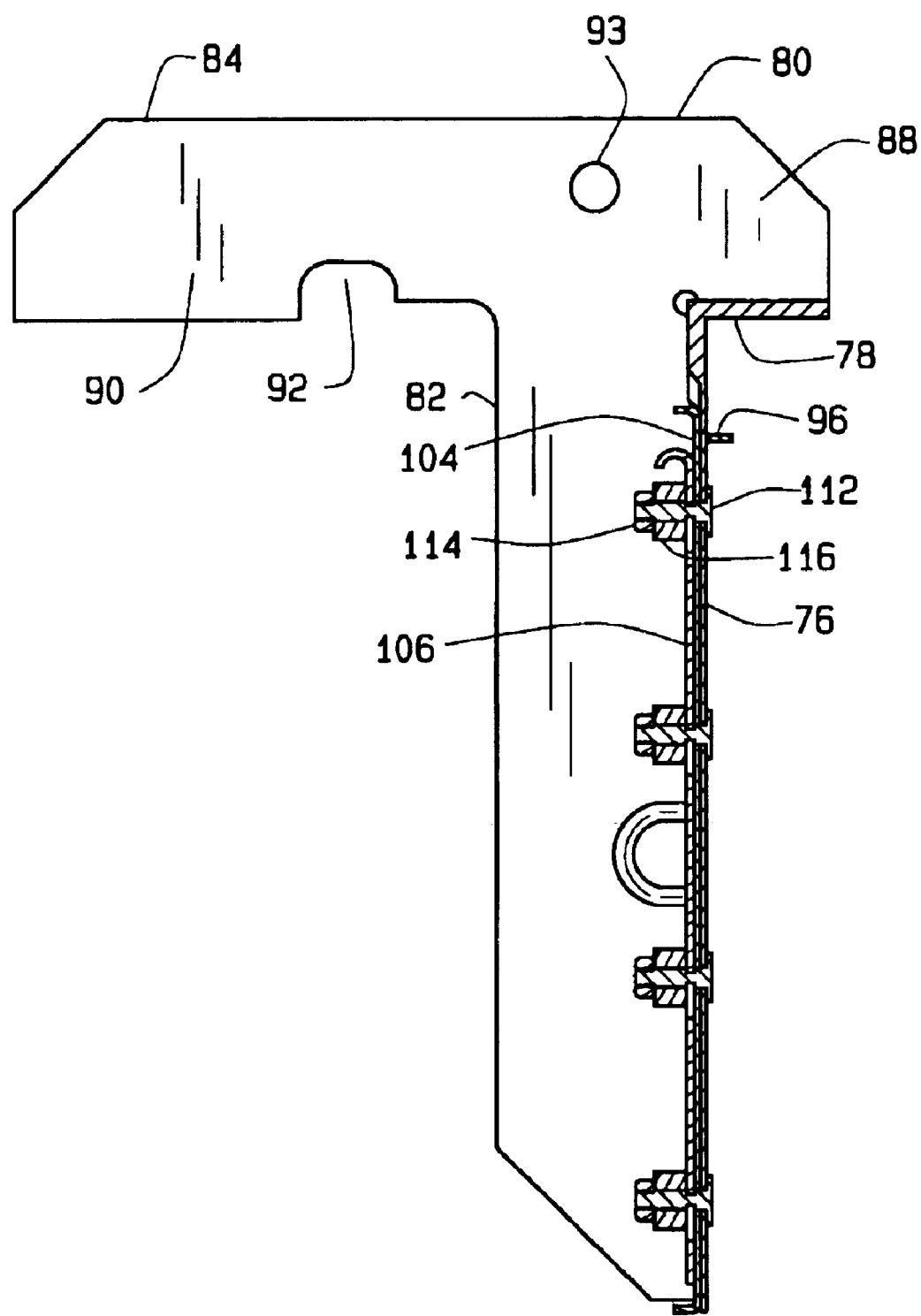
FIG. 5 is a side sectional view of the flow control apparatus shown in FIG. 3.

FIG. 3 is a perspective view of an exemplary embodiment of flow control apparatus 70, FIG. 4 is a front view of flow control apparatus 70, and FIG. 5 is a side sectional view of flow control apparatus 70. Referring to FIGS. 3, 4, and 5, flow control apparatus 70 includes an elongate perforated plate 76 coupled to a support member 78 and positioning members 80 coupled to support member 78 and perforated plate 76.

In one embodiment, perforated plate 76 is formed from one plate, in another embodiment, perforated plate 76 is formed from a plurality of perforated plates.

Perforated plate 76 is coupled to support member 78 by any suitable method, for example, by welding and/or by fasteners. In the exemplary embodiment, support member 78 has an L-shape and is welded to perforated plate 76. Positioning members 80 have a first portion 82 and a second portion 84 intersecting one end of first portion 82 at a substantially 90 degree angle. First portion 82 is coupled to a first side 88 of perforated plate 76 and a first section 88 of second portion 84 overlies and is coupled to support member 78. A second section 90 of second portion 84 of positioning members 78 is configured to engage dryer hood 74 to attach flow control apparatus 70 to steam dryer 50. Second section 90 is attached to dryer hood 74 by any suitable method, for example, by fasteners, by welding, by adhesive bonding, and the like. A recessed area 92 in second section 90 of second portion 84 of positioning members 78 facilitates welding second portion 84 of positioning member 78 to dryer hood 74. Positioning members 80 also include a lifting opening 93 sized to receive a lifting and/or positioning tool (not shown) to facilitate installing apparatus 70 into position in dryer 50.

Perforated plate 76 include a plurality of openings 94 extending therethrough which define the perforations in plate 76. The amount of open area of perforated plate 76 is, in one embodiment, less than 50 percent, in another embodiment, less than 25 percent, and in still another embodiment, less than 15 percent. Perforated plate 76 provides for a restriction at the top of dryer 50 to drive steam flow down through the middle and bottom of dryer 50 while permitting enough steam flow through openings 94 to prevent all the steam flow from going to the bottom of dryer 50. This levelizing of the steam flow improves the performance and efficiency of dryer 50.

A lip 96 extends longitudinally along a second side 98 of perforated plate 76. Lip 96 extends substantially perpendicular to second side 98 of plate 76. Lip 96 is referred to as an eddy blocker and is in one embodiment located near the top of perforated plate 76 facing the steam flow exiting from the dryer vanes. Lip 96 trips the steam flow traveling up second side 98 of plate 76 so that the direction and momentum of the steam flowing up second side 98 of plate 76 is interrupted. This reduces the volume of steam that can continue up plate 76 and escape as bypass flow through small gaps between the dryer hood and flow control apparatus 70.

Apparatus 70 also includes adjustable sealing members 100 and 102 attached to opposite longitudinal ends of perforated plate 76. Sealing members 100 and 102 each include a movable extension plate 104 and a clamping plate 106 attached to perforated plate 76 with fasteners 108. Extension plate 104 includes oblong fastener openings 110 which permit extension plate 104 to extend beyond the ends of perforated plate 76 to seal the area between plates 76 and the adjacent dryer structure, or between plates 76 and dryer skirt extension 75. Extension plate 104 is formed from any suitable material, for example, metal and/or a resilient material. In the exemplary embodiment, fasteners 108 include a threaded bolt 112, a nut 114 sized to threadedly engage bolt 112 and a plurality of spring washers 116. In alternate embodiments, fasteners 108 can be any suitable fastener, for example bolts with mating wing nuts, rivets, and the like.

Figure 6:
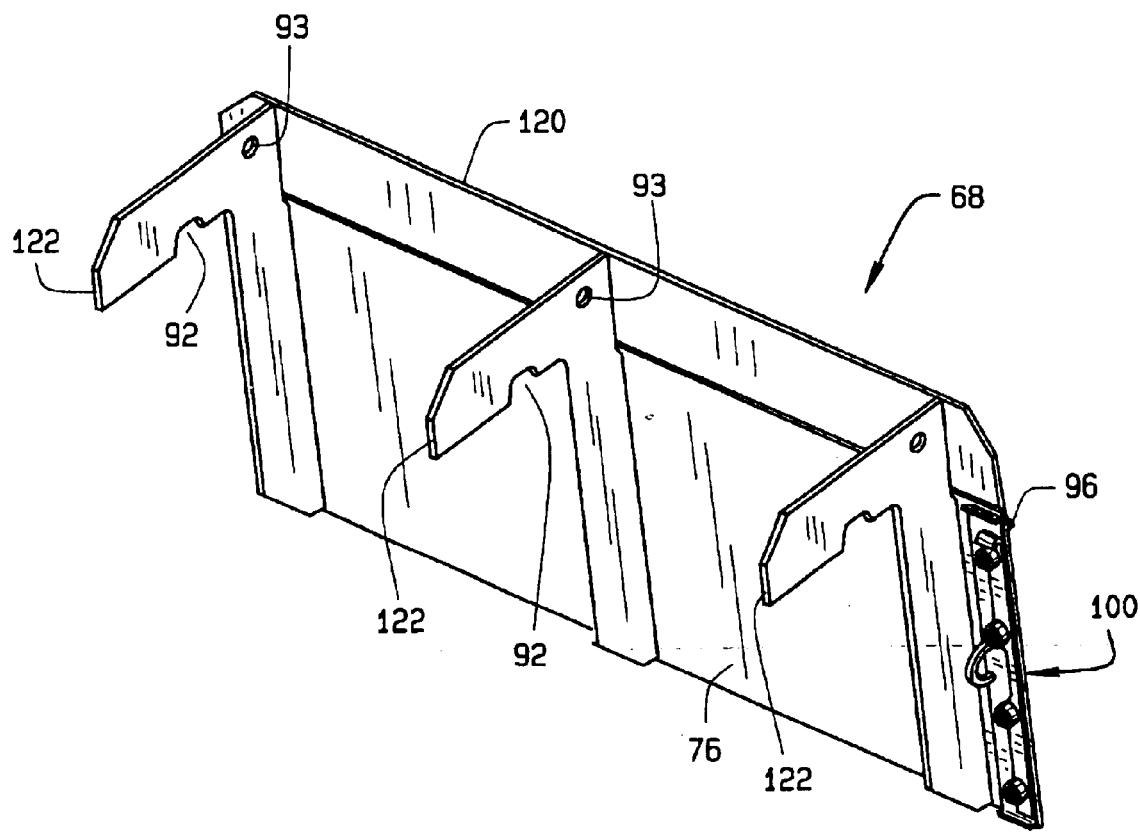
FIG. 6 is a perspective view of another flow control apparatus shown in FIG. 2.

FIG. 6 is a perspective view of flow control apparatus 68 (also shown in FIG. 2). Flow control apparatus 68 are similar to flow control apparatus 70 except for the configuration of the support member and the positioning members. Particularly, each flow control apparatus 68 includes a flat support member 120 coupled to perforated plate 76 and L-shaped positioning members 122 coupled to perforated plate 76 and support member 120. Positioning members 122 also include recessed areas 92 and lifting openings 93.

While the invention has been described in terms of various specific embodiments, those skilled in the art will recognize that the invention can be practiced with modification within the spirit and scope of the claims.

What is claimed is:

1. A flow control apparatus for a boiling water nuclear reactor steam dryer, the steam dryer comprising at least one discharge plenum, said flow control apparatus comprising:
   a support member;
   a elongate perforated plate member, coupled to said support member; and
   at least one positioning member coupled to said support member, each said at least one positioning member comprises a first portion and a second portion, said first portion coupled to said perforated plate member and said second portion extending from an end of said first portion at a substantially 90 degree angle.

2. An apparatus in accordance with claim 1 further comprising at least one lip extending longitudinally along a first side of said perforated plate member, said lip extending substantially perpendicular to said perforated plate member.

3. An apparatus in accordance with claim 1 wherein said perforated plate member comprises a plurality of plate members.

4. An apparatus in accordance with claim 1 wherein said at least one positioning member also coupled to said perforated plate member.

5. An apparatus in accordance with claim 1 wherein said support member has a substantially L-shape and said second portion of said positioning end overlies a top surface of said support member.

6. An apparatus in accordance with claim 1 further comprising a first adjustable sealing member coupled to a first end portion of said perforated plate member and a second adjustable sealing member coupled to a second end portion of said perforated plate member.

7. An apparatus in accordance with claim 6 wherein said first and second sealing members are adjustable in the longitudinal direction so that said first sealing member is adjustable to extend past said first end portion of said perforated plate member and said second sealing member is adjustable to extend past said second end portion of said perforated plate member.

8. A steam dryer for a nuclear reactor, said steam dryer comprising:
   a plurality of dryer vanes;
   at least one discharge plenum; and
   a flow control apparatus comprising:
      a support member;
      a elongate perforated plate member, coupled to said support member; and
      at least one positioning member coupled to said support member; and a first adjustable sealing member coupled to a first end portion of said perforated plate member and a second adjustable sealing member coupled to a second end portion of said perforated plate member.

9. A steam dryer in accordance with claim 8 wherein said flow control apparatus further comprises at least one lip extending longitudinally along a first side of said perforated plate member, said lip extending substantially perpendicular to said perforated plate member.

10. A steam dryer in accordance with claim 8 wherein said perforated plate member comprises a plurality of plate members.

11. A steam dryer in accordance with claim 8 wherein said at least one positioning member is coupled to said perforated plate member.

12. A steam dryer in accordance with claim 8 wherein each said at least one positioning member comprises a first portion and a second portion, said first portion coupled to said perforated plate member and said second portion extending from an end of said first portion at a substantially 90 degree angle.

13. A steam dryer in accordance with claim 12 wherein said support member has a substantially L-shape and said second portion of said positioning end overlies a top surface of said support member.

14. A steam dryer in accordance with claim 8 wherein said first and second sealing members are adjustable in the longitudinal direction so that said first sealing member is adjustable to extend past said first end portion of said perforated plate member and said second sealing member is adjustable to extend past said second end portion of said perforated plate member.

15. A steam dryer for a nuclear reactor, said steam dryer comprising:
   a plurality of dryer vanes;
   at least one discharge plenum; and
   a flow control apparatus comprising:
      a support member;
      a elongate perforated plate member, coupled to said support member;
      at least one positioning member coupled to said support member;
      at least one lip extending longitudinally along a first side of said perforated plate member, said lip extending substantially perpendicular to said perforated plate member;
      a first adjustable sealing member coupled to a first end portion of said perforated plate member; and
      a second adjustable sealing member coupled to a second end portion of said perforated plate member.

16. A steam dryer in accordance with claim 15 wherein said perforated plate member comprises a plurality of plate members.

17. A steam dryer in accordance with claim 15 wherein said at least one positioning member is coupled to said perforated plate member.

18. A steam dryer in accordance with claim 15 wherein each said at least one positioning member comprises a first portion and a second portion, said first portion coupled to said perforated plate member and said second portion extending from an end of said first portion at a substantially 90 degree angle.

19. A steam dryer in accordance with claim 18 wherein said support member has a substantially L-shape and said second portion of said positioning end overlies a top surface of said support member.

20. A steam dryer in accordance with claim 15 wherein said first and second sealing members are adjustable in the longitudinal direction so that said first sealing member is adjustable to extend past said first end portion of said perforated plate member and said second sealing member is adjustable to extend past said second end portion of said perforated plate member.

* * * * *

UNITED STATES PATENT AND TRADEMARK OFFICE
CERTIFICATE OF CORRECTION

| | | |
|---|---|---|
| PATENT NO. | : 6,810,837 B2 | Page 1 of 1 |
| APPLICATION NO. | : 09/683790 | |
| DATED | : November 2, 2004 | |
| INVENTOR(S) | : Lazarus et al. | |

It is certified that error appears in the above-identified patent and that said Letters Patent is hereby corrected as shown below:

Column 4, line 44, delete "a elongate" and insert therefor -- an elongate --

Column 5, line 18, delete "a elongate" and insert therefor -- an elongate --

Column 6, line 12, delete "a elongate" and insert therefor -- an elongate --

Signed and Sealed this

Second Day of January, 2007

JON W. DUDAS
*Director of the United States Patent and Trademark Office*